(12) United States Patent
Levsen

(10) Patent No.: US 8,893,391 B2
(45) Date of Patent: Nov. 25, 2014

(54) ROTARY KNIFE WITH MECHANISM FOR CONTROLLING BLADE HOUSING

(75) Inventor: Clark A. Levsen, Shawnee, KS (US)

(73) Assignee: Hantover, Inc., Overland Park, KS (US)

( * ) Notice: Subject to any disclaimer, the term of this patent is extended or adjusted under 35 U.S.C. 154(b) by 490 days.

(21) Appl. No.: 13/283,324

(22) Filed: Oct. 27, 2011

(65) Prior Publication Data

US 2013/0104404 A1 May 2, 2013

(51) Int. Cl.
| A22C 17/04 | (2006.01) |
| A22C 17/12 | (2006.01) |
| B26D 1/28 | (2006.01) |
| B26D 7/22 | (2006.01) |
| B26D 7/26 | (2006.01) |
| B26D 1/14 | (2006.01) |

(52) U.S. Cl.
CPC ............... *B26D 1/28* (2013.01); *B26D 7/2614* (2013.01); *A22C 17/12* (2013.01); *B26D 1/14* (2013.01); *B26D 7/225* (2013.01); *B26D 7/2621* (2013.01)
USPC ............................................. 30/276; 452/133

(58) Field of Classification Search
USPC ............................................. 30/276; 452/133
See application file for complete search history.

(56) References Cited

U.S. PATENT DOCUMENTS

| 3,269,010 | A | | 8/1966 | Bettcher | |
| 4,236,531 | A | * | 12/1980 | McCullough | 30/276 |
| 4,363,170 | A | * | 12/1982 | McCullough | 30/276 |
| 4,439,924 | A | | 4/1984 | Bettcher | |
| 4,575,938 | A | | 3/1986 | McCullough | |
| 4,854,046 | A | | 8/1989 | Decker et al. | |
| 5,692,307 | A | | 12/1997 | Whited et al. | |
| 5,940,972 | A | | 8/1999 | Baris et al. | |
| 6,604,288 | B2 | * | 8/2003 | Whited et al. | 30/276 |
| 6,615,494 | B2 | | 9/2003 | Long et al. | |
| 7,000,325 | B2 | | 2/2006 | Whited | |
| 8,037,611 | B2 | | 10/2011 | Levsen | |
| 2007/0283574 | A1 | * | 12/2007 | Levsen | 30/276 |
| 2008/0098605 | A1 | | 5/2008 | Whited et al. | |
| 2010/0170097 | A1 | | 7/2010 | Levsen | |
| 2011/0185580 | A1 | | 8/2011 | Whited | |
| 2013/0104404 | A1 | * | 5/2013 | Levsen | 30/276 |
| 2013/0326886 | A1 | * | 12/2013 | Levsen | 30/276 |

FOREIGN PATENT DOCUMENTS

EP 1403012 A2 11/2008
WO WO 2013/062973 A1 * 5/2013

OTHER PUBLICATIONS

International Search Report and Written Opinion from PCT Application No. PCT/US2012/061494 entitled Rotary Knife With Mechanism for Controlling Blade Housing (Dated Apr. 1, 2013).

* cited by examiner

*Primary Examiner* — Hwei C Payer
(74) *Attorney, Agent, or Firm* — Hovey Williams LLP

(57) ABSTRACT

A rotary knife includes a handle, a rotatable annular blade, and a blade carrier assembly. The blade carrier assembly includes an expandable blade housing operably coupled to the handle and configured to removably support the blade. The blade housing is movable relative to the handle between a blade-securing condition, in which the blade housing securely supports the blade for rotational operation, and a relatively expanded blade-releasing condition, in which the blade housing permits removal and installation of the blade relative to the blade housing. The carrier assembly includes a lever mechanism shiftably mounted relative to the handle and configured when shifted to expand the blade housing from the blade-securing condition to the blade-releasing condition.

18 Claims, 9 Drawing Sheets

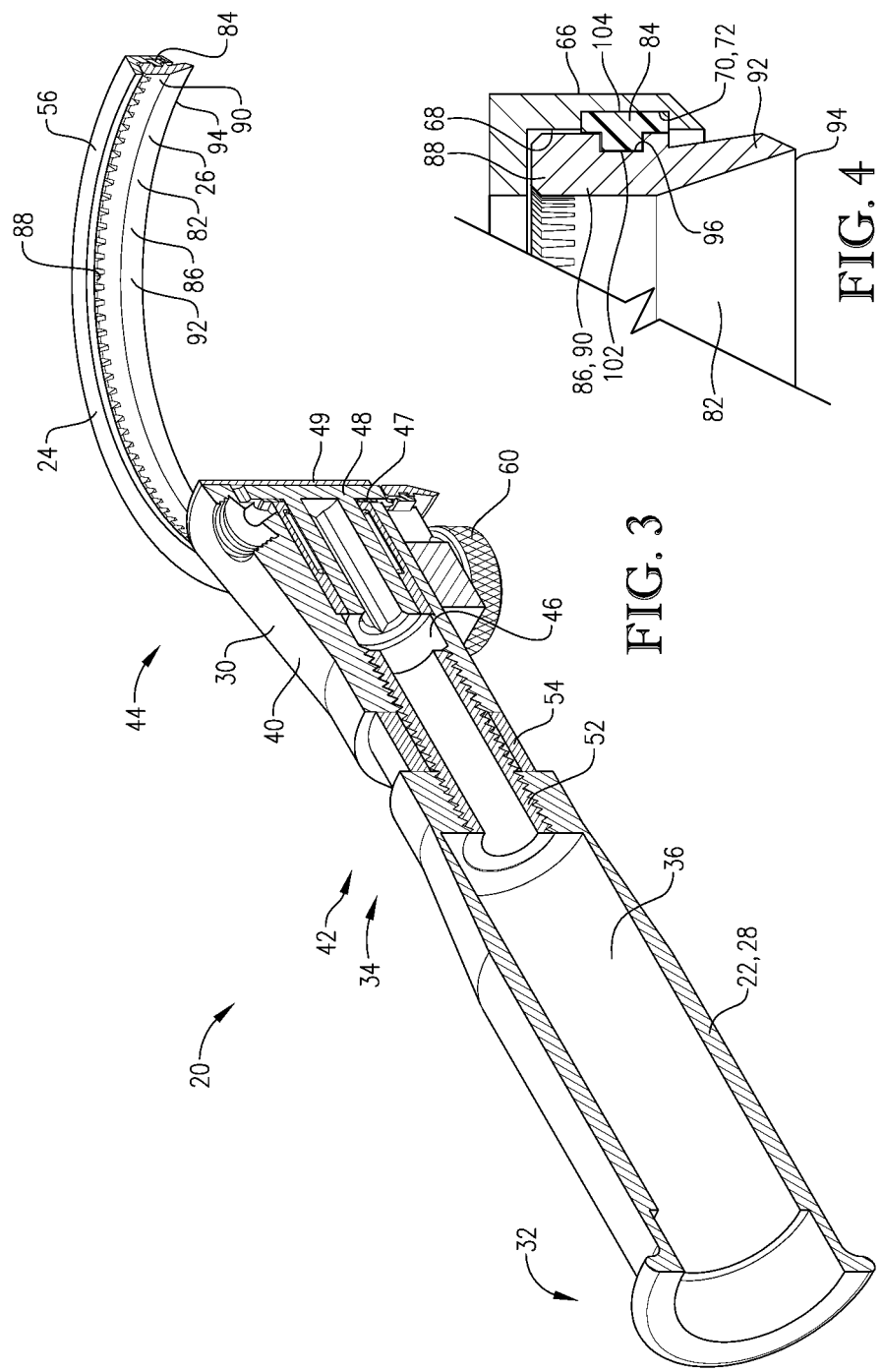

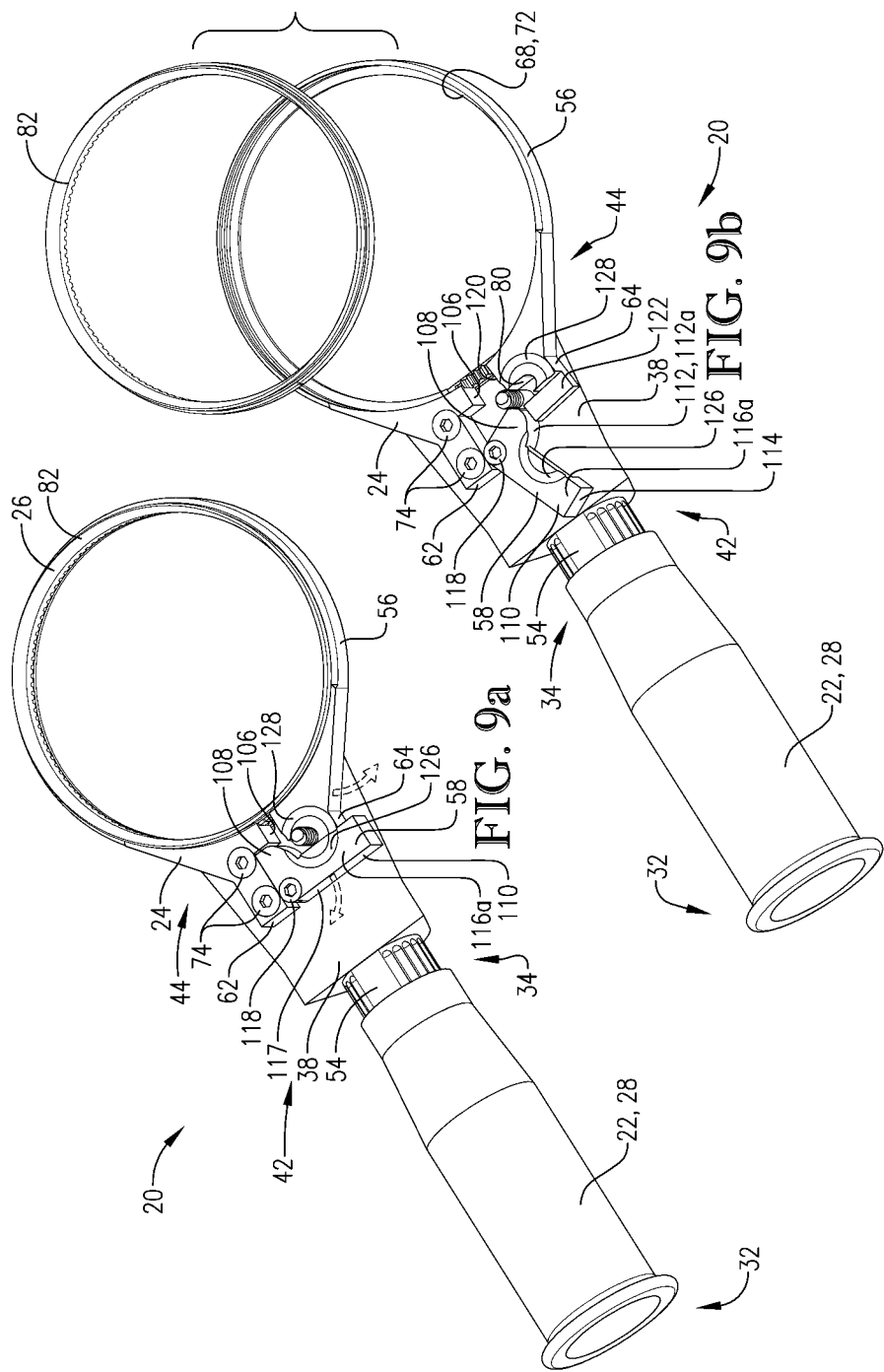

ROTARY KNIFE WITH MECHANISM FOR CONTROLLING BLADE HOUSING

BACKGROUND

1. Field

The present invention relates generally to powered knives, such as those commonly used in meat processing plants. More specifically, embodiments of the present invention concern a rotary knife with a rotating blade assembly.

2. Discussion of Prior Art

Powered rotary knives that are used in the meat processing industry for dressing an animal carcass are known in the art. The process of dressing the carcass normally involves the removal of meat and fat from various bones as well as cutting various bones. Powered rotary knives enable workers to perform this process with great efficiency. Such prior art knives include a housing and a rotary knife assembly with an endless annular blade that can be removed for sharpening or replacement.

However, it has been found that prior art rotary knives suffer from certain limitations. For instance, the high-speed rotational movement of the annular blade, which is ideal for quickly and efficiently processing meat, causes the cutting edge of the annular blade to quickly become dull and require frequent sharpening or replacement. Conventional rotary knives also suffer from problems associated with blade maintenance. For example, conventional knives require an inordinate amount of time to remove and install the blade during blade maintenance. Furthermore, the process of installing the blade requires precise blade alignment relative to the blade housing, and the blade housing construction makes such alignment difficult to achieve.

SUMMARY

The following brief summary is provided to indicate the nature of the subject matter disclosed herein. While certain aspects of the present invention are described below, the summary is not intended to limit the scope of the present invention.

Embodiments of the present invention provide a rotary knife that does not suffer from the problems and limitations of the prior art powered knives set forth above.

A first aspect of the present invention concerns a rotary knife that broadly includes a handle, a rotatable annular blade, and a blade carrier assembly. The blade carrier assembly includes an expandable blade housing operably coupled to the handle and configured to removably support the blade. The blade housing is movable relative to the handle between a blade-securing condition, in which the blade housing securely supports the blade for rotational operation, and a relatively expanded blade-releasing condition, in which the blade housing permits removal and installation of the blade relative to the blade housing. The carrier assembly includes a lever mechanism shiftably mounted relative to the handle and configured when shifted to expand the blade housing from the blade-securing condition to the blade-releasing condition.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 3 is a longitudinal cross section of the rotary knife as shown in FIGS. 1 and 2, showing the base and grip housing of the handle being interconnected by a threaded sleeve, and showing a driven gear rotatably mounted in the base;

FIG. 4 is a greatly enlarged fragmentary cross section of the rotary knife as shown in FIGS. 1-3, showing a blade and a bushing of the blade assembly rotatably mounted within the blade carrier assembly;

Figure 9C:
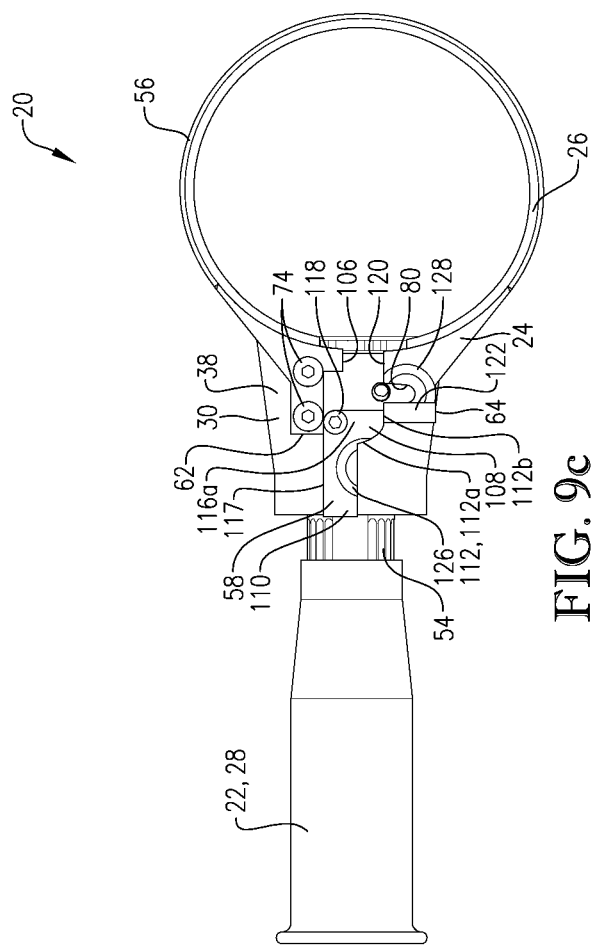
FIG. 9a is a fragmentary bottom view of the rotary knife shown in FIGS. 1-8, showing the rotary knife in the blade-securing condition, with the threaded nut removed to show the lever in the closed position.

FIG. 9b is a fragmentary bottom view of the rotary knife similar to FIG. 9a, but showing the lever pivoted to an intermediate position between the closed position and an open position, with the blade housing shifted to an intermediate condition; and FIG. 9c is a fragmentary bottom view of the rotary knife similar to FIG. 9b, but showing the lever pivoted to a fully open position, with the blade housing shifted to a blade-releasing condition.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
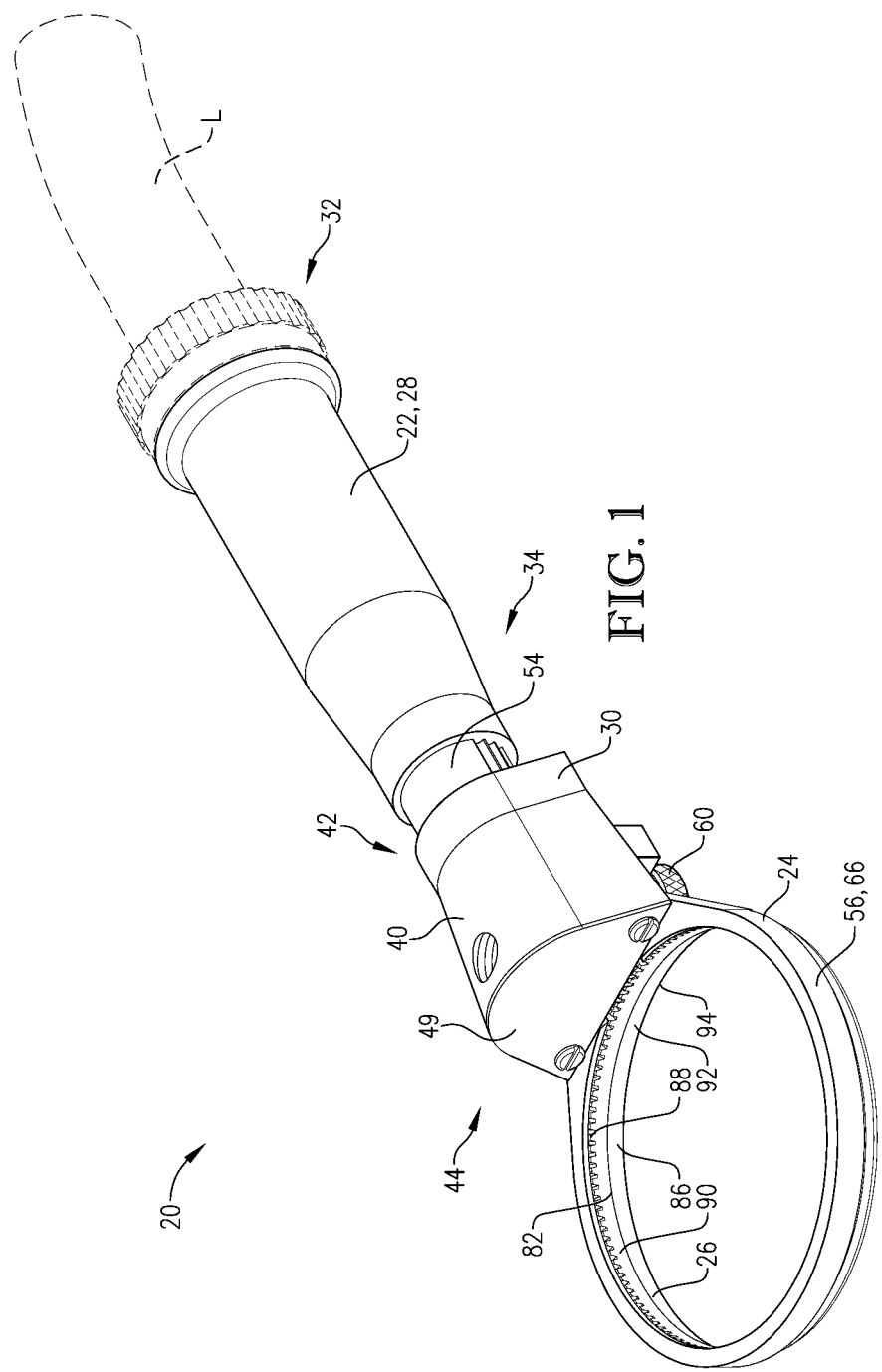
FIG. 1 is an upper perspective of a rotary knife constructed in accordance with a preferred embodiment of the present invention, with the rotary knife depicted as being operably coupled to a pneumatic supply line, and with the rotary knife including a handle, a blade carrier assembly, and a rotating blade assembly.
Figure 2:
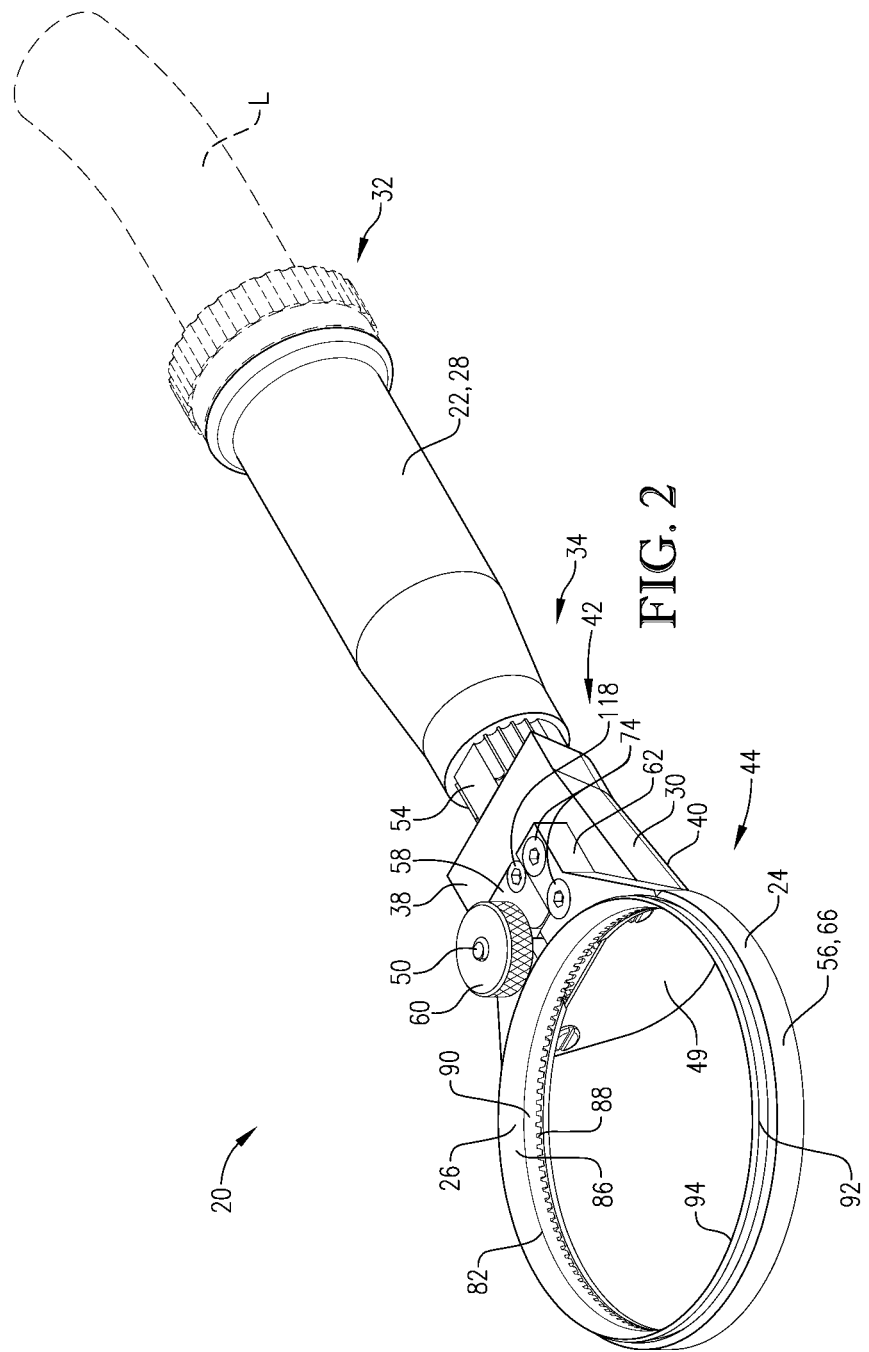
FIG. 2 is a lower perspective of the rotary knife as shown in FIG. 1, showing the blade carrier assembly mounted on and secured to a base of the handle.

Turning initially to FIGS. 1 and 2, a rotary knife 20 is constructed in accordance with a preferred embodiment of the present invention. The illustrated rotary knife 20 is particularly well suited for use in meat processing facilities, although other knife applications are entirely within the ambit of the present invention. The illustrated rotary knife 20 is preferably pneumatically powered by a pressurized air source (not shown), e.g., an air compressor. However, the principles of the present invention are equally applicable where the rotary knife is driven by alternative external power sources, such as sources that transmit power through hydraulic power or electrical power. The rotary knife 20 broadly includes a handle 22, a blade carrier assembly 24, and a rotating blade assembly 26.

Turning to FIGS. 1 and 2, the handle 22 includes a grip housing 28 and a base 30. The grip housing 28 has a generally cylindrical shape and extends between a proximal connector end 32 for interfacing with a pneumatic supply line L (see FIG. 1) and a distal end 34. The grip housing 28 further presents an internal passage 36 (see FIG. 3) that houses a pneumatic motor (not shown).

The base 30 includes a body with a generally flat wall 38 and a curved wall 40 that extend between proximal and distal ends 42,44 of the base 30. The body presents a gear-receiving socket 46 that extends proximally from the distal end 44. The base also has threaded holes spaced along the flat wall 38 (see FIG. 5). The socket 46 is sized to receive a washer 47 and a spur gear 48 and to permit rotation of the spur gear 48. The spur gear 48 is interconnected with and is driven by the pneumatic motor. The base 30 also includes a cover 49 removably attached to a distal end of the handle 22, with the cover 49 being in a generally covering relationship with the socket 46. The base 30 further includes a threaded stud 50 attached to and projecting outwardly from the flat wall 38.

The base 30 is attached to the grip housing 28 with a threaded sleeve 52 and a bushing 54. In particular, the bushing 54 is slidably received on the sleeve 52. The sleeve 52 is threaded into the distal end 34 of the housing 28 and the proximal end 42 of the base 30. Thus, the grip housing 28, base 30, and sleeve 52 cooperatively present a chamber to receive a motor and drive train (not shown) operable to drive the spur gear 48 and the blade.

Turning to FIGS. 2 and 5-8, the blade carrier assembly 24 supports the blade during knife operation and permits blade rotation. In the illustrated embodiment, the blade carrier assembly 24 generally includes a split blade housing 56, a lever 58, and a threaded nut 60.

The split blade housing 56 is substantially unitary and annular and includes adjacent housing ends 62,64 and an annular ring that extends continuously between the ends. The ring includes an arcuate outer surface 66 and an arcuate inner surface 68 including a groove 70 which serves as a race for rotatably supporting the blade assembly 26 as will be discussed (see FIG. 4). Between the ends 62,64, the groove 70 extends along the perimeter of the housing 56. Thus, the blade housing presents a socket 72 that receives the blade.

While the illustrated blade housing 56 includes the single groove 70, it is consistent with the principles of the present invention for the blade housing 56 to include multiple grooves for engagement with the blade assembly 26. Moreover, it is also within the ambit of the present invention for the groove 70 to include alternative shapes or surface features. Additional details of a rotary knife with such alternative groove structures are disclosed in U.S. Pat. No. 8,037,611, issued Oct. 18, 2011, entitled ROTARY KNIFE WITH BLADE BUSHING, which is hereby incorporated in its entirety by reference herein.

The blade housing 56, as well as the handle 22, are preferably manufactured from a tempered steel to resist oxidation and corrosion within the adverse environment of a slaughterhouse. However, the principles of the present invention are equally applicable where the blade housing 56 and handle 22 include other metallic or non-metallic materials such as brass, aluminum, or stainless steel. The blade housing 56 or handle 22, either entirely or partly, may alternatively include an outermost layer of brass, aluminum, or stainless steel that is suitable for surface-to-surface engagement with the blade assembly 26. In this manner, such an outermost layer, whether coated, adhered, or otherwise secured onto the base material, may provide an optimal surface for low-friction bearing engagement with the blade assembly 26. However, the outermost layer may be included for other purposes, such as corrosion resistance, aesthetic qualities, or other performance requirements.

Figure 5:
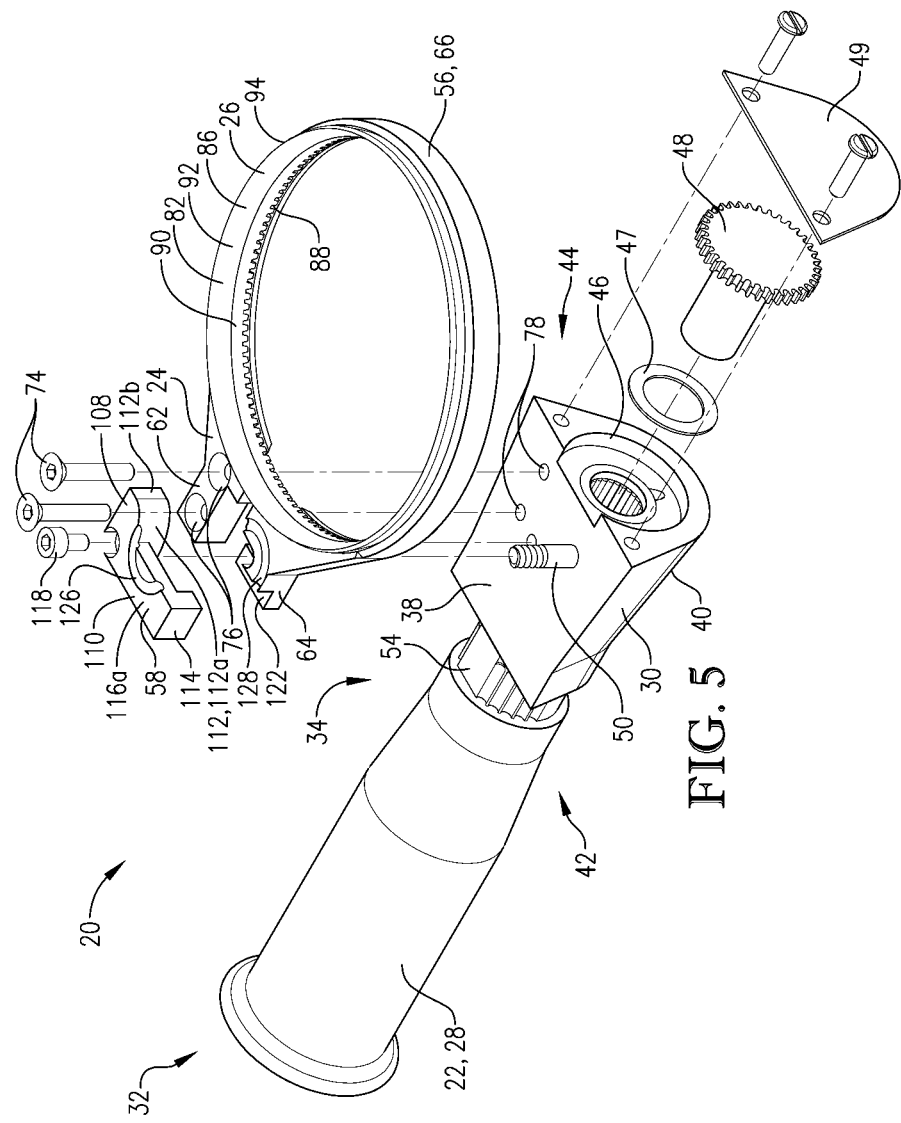
FIG. 5 is a lower perspective of the rotary knife shown in FIGS. 1-4, showing the blade carrier assembly and blade assembly detached from the handle, and showing a cover, a spur gear, a washer, and fasteners exploded from the base.

The blade housing 56 is attached to the base 30 with fasteners 74 that extend through holes 76 in the end 62 and into threaded holes 78 in the base 30 (see FIG. 5). Furthermore, the blade housing 56 is selectively secured to the base 30 with threaded stud 50 and threaded nut 60, as will be discussed further.

The blade housing 56 is shiftable between a blade-securing condition and a fully open blade-releasing condition (see FIGS. 9a and 9c). In the blade-securing condition, the ends 62,64 are positioned adjacent one another so that the threaded stud 50 is received in a slot 80 presented by end 64 (see FIG. 9a). Furthermore, the socket 72 of the blade housing 56 presents a socket diameter dimension D so that the blade assembly 26 is secured in the socket 72 (see FIG. 7).

In the blade-releasing condition, the end 64 is shifted laterally relative to the threaded stud 50. The ends 62,64 are spaced apart so that the socket diameter dimension D is enlarged relative to the blade-securing condition.

Figure 7:
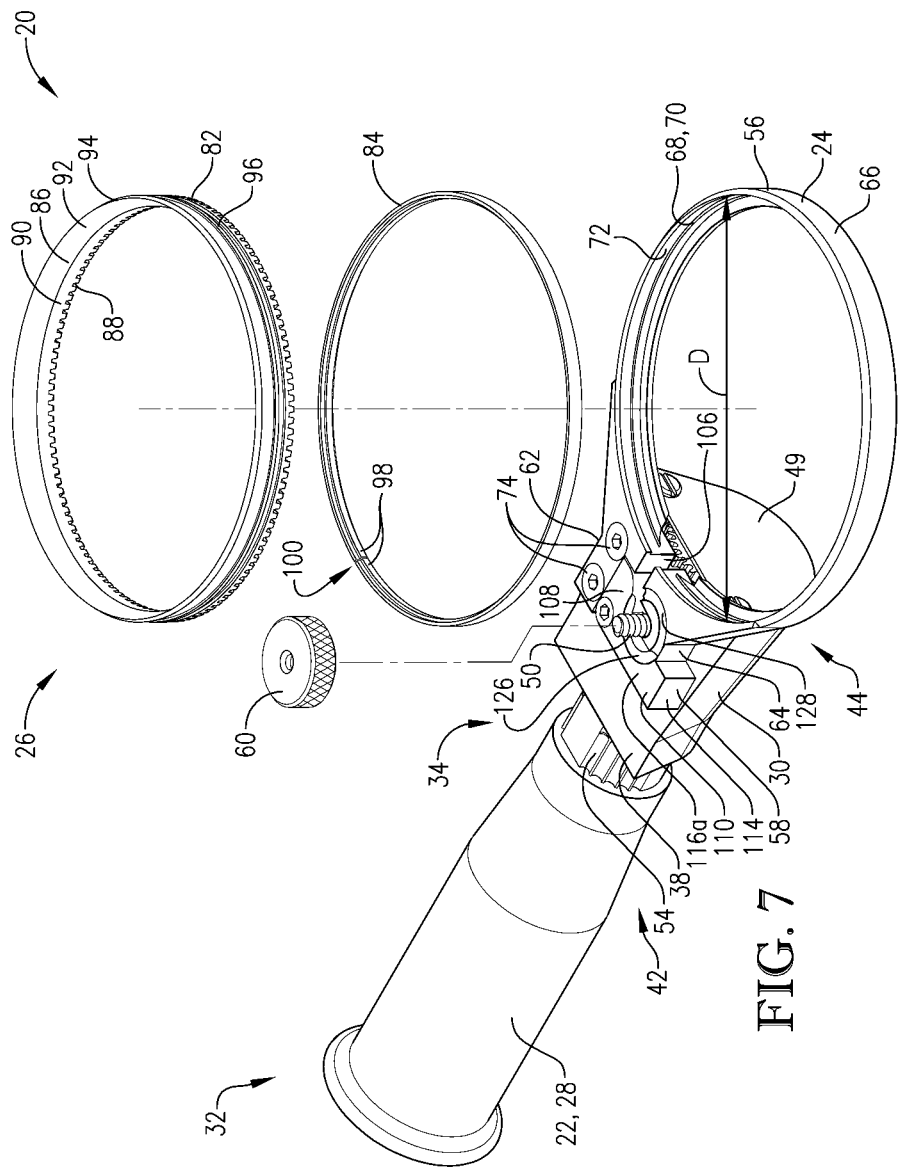
FIG. 7 is a lower perspective of the rotary knife shown in FIGS. 1-6, showing the blade assembly exploded from the blade carrier assembly, and showing the threaded nut detached from the rotary knife to show the lever and split blade housing in a blade-securing condition, with the lever in a corresponding closed position.
Figure 8:
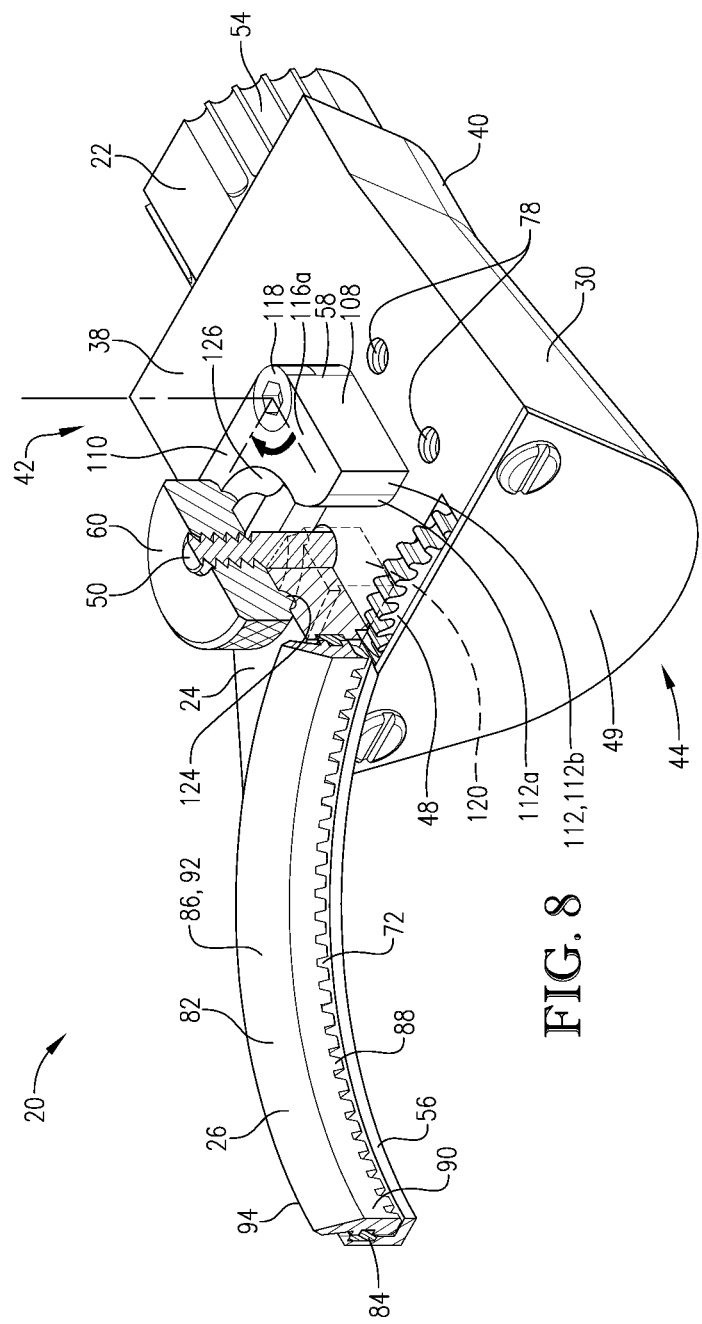
FIG. 8 is an enlarged fragmentary perspective of the rotary knife shown in FIGS. 1-7, showing parts of the blade assembly and blade carrier assembly removed to depict how the threaded nut engages the blade housing and the lever in the blade-securing condition.

Turning to FIGS. 4, 7, and 8, the blade assembly 26 includes an annular blade 82 and an annular bushing 84. The blade 82 is unitary and is substantially continuous around its circumference. The blade 82 includes a blade wall 86 and a ring gear 88 extending from the blade wall 86 for mating engagement with the spur gear 48. The blade wall 86 includes a support section 90 and a cutting section 92 spaced from the support section 90. The cutting section 92 includes a sharp cutting edge 94 and the support section 90 includes an arcuate outer groove 96 (see FIG. 4). If desired, the blade 82 may be alternatively configured to include other types of edges. For example, instead of the sharp edge 94, the blade 82 could alternatively include an abrasive edge (e.g., with a surface that is gritted), a bristled edge, or a brush-type shredding edge. Similar to the blade housing 56, it is consistent with the principles of the present invention for the blade 82 to include multiple grooves (e.g., for engagement with multiple bushings). Moreover, it is also within the ambit of the present invention for the groove 96 to include alternative surface features.

The blade 82 is preferably manufactured from tempered steel. However, similar to the blade housing 56 and handle 22, the principles of the present invention are applicable where the blade 82 includes other metallic or non-metallic materials, such as brass, aluminum, or stainless steel. Alternatively, the blade 82, either entirely or partly, may include an outermost layer of brass, aluminum, or stainless steel that is suitable for surface-to-surface engagement with the bushing 84. In this manner, such an outermost layer, whether coated, adhered, or otherwise secured onto the base material, may provide an optimal surface for low-friction bearing engagement. However, the outermost layer may be included for other purposes, such as corrosion resistance, aesthetic qualities, or other performance requirements.

The blade wall 86 extends axially from the ring gear to the cutting edge 94, with the wall thickness reducing in size from the support section 90 to the cutting edge 94. Thus, the cutting section 92 extends in an axial direction for cutting. However, the principles of the present invention are equally applicable where the cutting section 92 is directed in a more radial direction. Additional features of such a radially-extending blade, and other preferred blades, are shown in the above-incorporated '611 patent.

The bushing 84 is preferably unitary and includes an annular body with bushing ends 98 (see FIG. 7). The ends 98 are located adjacent to each other preferably such that the annular body forms an essentially endless bearing surface. The principles of the present invention are also applicable where the body is in fact endless. The body preferably has an outermost diameter of between about 1 to 5 inches, although other sizes are entirely within the ambit of the present invention. If desired, the ends 98 may define a gap 100 therebetween (as illustrated). The gap 100 is preferably less than about 1 inch and, more preferably, the gap 100 ranges from about 0.1 inches to about 0.3 inches. The bushing 84 is generally dimensioned and constructed so that it is operable to deform elastically during installation between the blade 82 and blade housing 56.

Turning to FIG. 4, the annular body includes an inner perimeter surface 102 and an outer perimeter surface 104. The illustrated inner perimeter surface 102 includes shoulders that define an annular interior rib. The outer perimeter surface 104 includes a generally flat profile. However, other bushing shapes and designs are entirely within the ambit of the present invention. That is, the principles of the present invention are also applicable where the surfaces 102,104 include alternative convex or concave profiles. Moreover, the principles of the present invention are also applicable to a bushing with multiple segments. For example, the bushing 84 may include a plurality of substantially circular segments that are spaced relative to each other (e.g., concentrically spaced, or axially spaced). Alternatively, the bushing 84 may include arcuate segments arranged in series in a substantially circular form. The principles of the present invention are further applicable where the bushing includes a bearing other than a journal bearing, such as a ball bearing.

The bushing 84 preferably includes an ABS plastic or an Acetal plastic such as Delrin®. However, the principles of the present invention are also applicable where the bushing 84 is constructed from plastic, other non-metallic, or metallic materials suitable for use in a bushing application. For example, the bushing 84, either entirely or partly, may include an outermost layer of brass, aluminum, or stainless steel that is suitable for surface-to-surface engagement with the blade 82 and blade housing 56. In this manner, such an outermost layer, whether coated, adhered, or otherwise secured onto the base material (e.g., plastic), may provide an optimal surface for low-friction bearing engagement. However, the outermost layer may be included for other purposes, such as corrosion resistance, aesthetic qualities, or other performance requirements.

Figure 6:
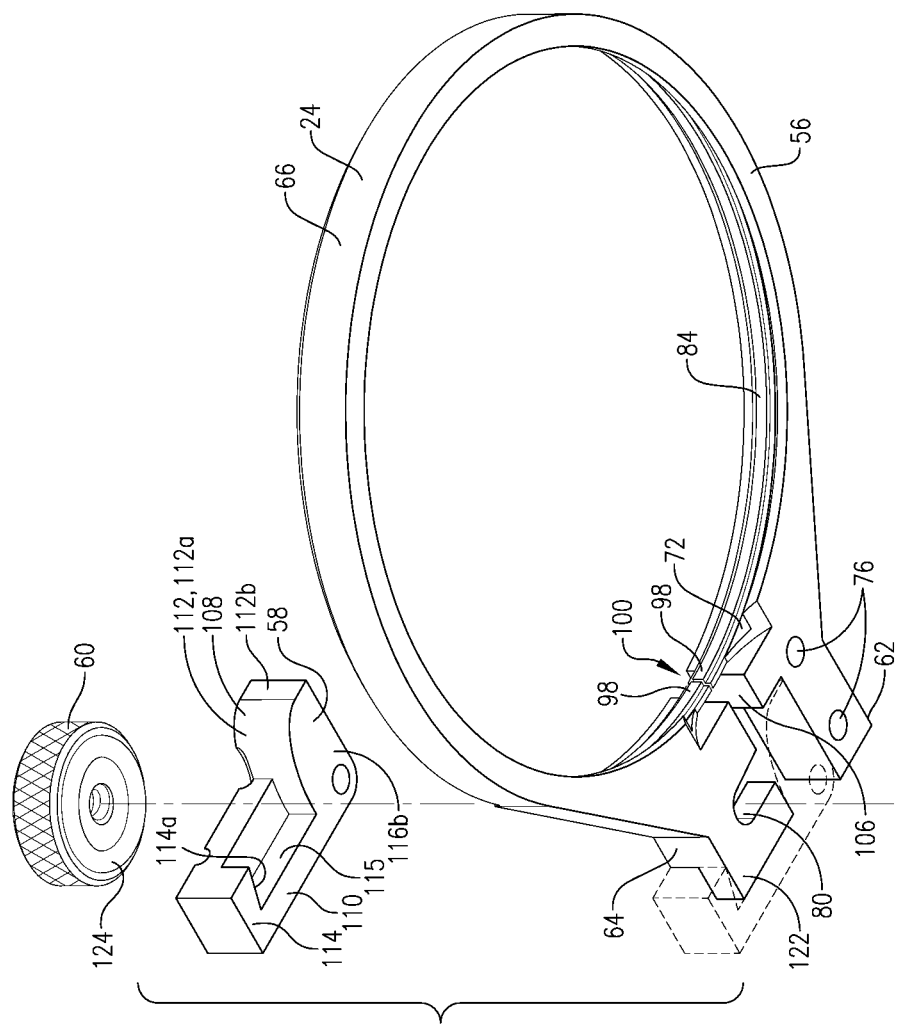
FIG. 6 is a fragmentary lower perspective of the rotary knife shown in FIGS. 1-5, showing a split blade housing, lever, and threaded nut of the blade carrier assembly.

Turning to FIGS. 5-7, when the bushing 84 is received within the outer groove 96, the interior rib of the bushing 84 is spaced within and is configured to substantially conform to the shape of the outer groove 96. The ends 98 are normally spaced adjacent to each other with the small gap 100 remaining therebetween. Thus, the bushing 84 provides a substantially continuous circumference or bearing surface.

The blade assembly 26 is assembled onto the blade housing 56 by first inserting the bushing 84 into the groove 70. Insertion of the split bushing 84 occurs by initially placing one of the ends 98 into the groove 70, which may require slight deformation of the bushing 84. Subsequently, the remainder of the bushing 84 may be placed within the groove 70 by progressively inserting portions of the bushing 84 along the circumferential direction. When the bushing 84 is received within the groove 70, the outer perimeter surface 104 is spaced within and is configured to substantially conform to the shape of the groove 70.

The blade 82 is mounted within the blade housing 56 by first aligning the gap 100 of the bushing 84 with a housing gap 106 defined between ends 62,64 (see FIG. 6). In this orientation, the blade housing 56 and bushing 84 are configured to be simultaneously and elastically deformed in an outward direction to expand in diameter, thus increasing the size of the gaps 100,106. This expansion permits the blade 82 to be placed therein, with the groove 70 being placed into an opposed relationship with the groove 96 (where "opposed relationship" is defined herein as the grooves 70,96 facing in opposite directions). Moreover, the illustrated grooves 70,96 are oppositely spaced from each other (with "oppositely spaced" defined herein as the grooves 70,96 being in opposed relationship and directly facing each other, i.e., not offset from each other along the blade axis). Again, the principles of the present invention are applicable where the grooves 70,96 are in opposed relationship to each other. For example, an alternative pair of circular grooves may have a common axis but be offset from each other along the axis. Those of ordinary skill in the art will appreciate that the bushing 84 may alternatively be first placed on the blade 82, and then the assembled blade assembly 26 positioned within the blade housing 56, without departing from the spirit of the present invention.

Turning to FIGS. 5-9c, the lever 58 is preferably elongated and presents interconnected camming and locking sections 108,110. Each of the sections 108,110 has an elongated shape and are integrally joined at corresponding ends thereof to form a junction. The illustrated sections 108,110 preferably extend from the junction at generally right angles to one another, although other angular relationships are within the ambit of the present invention. The illustrated camming section 108 presents a housing engagement surface 112 that preferably includes a curved cam surface 112a and a generally flat stop surface 112b. The cam surface 112a preferably extends from a location adjacent the locking section 110 to the stop surface 112b. Preferably, the stop surface 112b extends generally parallel to an oppositely positioned surface of the locking section 110, as will be discussed.

Again, the locking section 110 has an elongated shape and presents opposite ends, with one end being integrally joined with the camming section 108. The other end is defined by an end wall 114 that presents a lock surface 114a operable to engage the housing end 64, as will be discussed (see FIG. 6). The locking section 110 presents a groove 115 that extends longitudinally from the end wall 114 to the cam surface 112a. The groove 115 extends from a location between top and bottom surfaces 116a,b of the lever 58 and extends to the bottom surface 116b. The locking section 110 also presents a longitudinal side surface 117 that faces away from the groove 115 and extends substantially parallel to the stop surface 112b (see FIG. 9a).

Turning to FIGS. 9a-9c, the lever 58 is swingably mounted to the base 30 with a threaded fastener 118. The illustrated lever 58 is pivotable between a closed position (see FIG. 9a) and an open position (see FIG. 9b). However, the principles of the present invention are applicable where an alternative device is used to engage and shift the housing end 64. For instance, the carrier assembly 24 could have a multiple-element linkage to engage and shift the housing end 64. Also, the device could be mounted to the housing end 64 so that the device remains engaged with the housing end 64. Furthermore, the device could be entirely mounted on structure other than the base, such as the blade housing 56.

Turning to FIG. 9b, the blade housing 56 is resiliently expandable in an opening direction from the blade-securing condition into the blade-releasing condition. The blade housing 56 is preferably urged into the blade-releasing condition by pivoting the lever 58 from the closed position to the open position. In moving the lever 58 out of the closed position, the cam surface 112a preferably engages a follower surface 120 of the housing end 64 (see FIGS. 9a and 9c). As the lever 58 rotates out of the closed position, the camming section 108 moves the housing end 64 away from housing end 62.

Preferably, the lever 58 has an over-center position (not shown) spaced between the open and closed positions. In the illustrated embodiment, the over-center position is associated with a condition where the blade housing 56 is expanded to a maximum extent by the lever 58 (i.e., the socket diameter dimension D has a maximum value compared to any other conditions where the lever 58 engages the blade housing 56). Thus, when the lever 58 is positioned between the over-center and closed positions, the force exerted by the housing end 64 on the lever 58 urges the lever 58 in a closing direction. Also, when the lever 58 is positioned between the over-center and open positions, force exerted by the housing end 64 on the lever 58 urges the lever 58 in the opening direction. Consequently, the preferred over-center mechanism urges the lever 58 generally toward one of the open and closed positions, and it has been found that this configuration enhances safety during blade removal and installation.

Again, it is also within the ambit of the present invention where the blade housing 56 is expanded by an alternative mechanism. As discussed above, the carrier assembly 24 could have a multiple-element linkage to engage and shift the end 64.

With the blade housing 56 in the blade-releasing condition, the socket 72 has an enlarged diameter dimension so that the blade 82 and bushing 84 can be selectively inserted and removed from the socket 72. While the blade-releasing condition corresponds with the lever 58 in the illustrated open position (see FIG. 9c), it will be appreciated that the depicted lever 58 could be alternatively positioned to permit blade removal and blade installation. Furthermore, it is within the ambit of the present invention where the ends of the blade housing 56 are alternatively positioned for blade removal and blade installation.

The lever 58 also preferably includes the stop surface 112b so that the lever 58 holds the blade housing 56 in the blade-releasing condition and restricts the blade housing 56 from shifting out of the blade-releasing condition. In particular, the stop surface 112b preferably engages the follower surface 120 when the lever 58 is in the open position (see FIG. 9c). The shape of surfaces 112b,120 restricts the lever 58 from pivoting out of the open position. Thus, the stop surface 112b serves to restrict the blade-housing 56 from shifting out of the blade-releasing condition, where the housing ends 62,64 would correspondingly shift toward one another.

The blade housing 56 is operable to contract by shifting in the closing direction toward the blade-securing condition so that the housing ends 62,64 are moved toward one another. Correspondingly, the lever 58 is pivoted out of the open position and toward the closed position. In moving the lever 58 out of the open position, the stop surface 112b must be moved out of engagement with the follower surface 120 so that the lever 58 can be further pivoted in the closing direction.

As the blade housing 56 approaches the blade-securing condition, the lever 58 must pivot into the closed position. Preferably, the lever 58 pivots into the closed position so that a tab 122 located adjacent the end 64 is captured within the groove 115 (see FIGS. 6 and 9b). Furthermore, with the lever 58 in the closed position and the blade housing 56 in the blade-securing condition, the tab 122 is adjacent the end wall 114 so that the end wall 114 restricts the housing ends 62,64 from separating, i.e., from moving away from each other out of the blade-securing condition.

The illustrated blade housing 56 is shifted into the blade-securing condition generally by initially applying some force to shift the lever 58 from the open position to the over-center position. Further shifting of the lever 58 beyond the over-center position toward the closed position generally occurs without applying force to the lever 58 (i.e., the over-center feature automatically urges shifting of the lever 58 toward the closed position), although some force may be required to overcome any friction between the lever 58, blade housing 56, and base 30. It is also within the scope of the present invention where the carrier assembly 24 has an alternative device, such as a lever, that at least partly assists with returning the blade housing 56 to the blade-securing condition. For instance, in one alternative embodiment, the section 108 could be pivotally attached to housing end 64 so that the lever 58 could be employed to urge the housing end 64 in either an opening or closing direction.

With the blade housing 56 in the blade-releasing condition, the socket 72 has an enlarged diameter dimension so that the blade 82 and bushing 84 can be selectively inserted and removed from the socket 72. In the closed position, the groove 115 of the lever 58 captures the tab 122 so as to restrict movement of the end 64 of the blade housing 56.

The lever 58 and end 64 are preferably held in the blade-securing condition by the nut 60, which is threaded onto the stud 50. The nut 60 presents a circular rib 124 on one side thereof (see FIG. 6). The nut 60 is fastened in a locked position (see FIG. 8) so that the rib 124 is received by and frictionally engages curved grooves 126,128 presented by the lever 58 and blade housing 56. Furthermore, the nut 60 serves to apply pressure to the lever 58 along the axis of the stud 50 so that the nut 60 frictionally clamps the lever 58 in place. Thus, the nut 60 operates as a locking mechanism to prevent the lever 58 from inadvertently moving in the opening direction.

The nut 60 is movable out of the locked position to permit shifting of the blade housing 56 out of the blade-securing position. For instance, the nut 60 can be threaded into an unlocked position (not shown) on the stud 50 where the nut 60 is spaced from the lever 58 and blade housing 56 and the rib 124 is entirely disengaged from the grooves 126,128. Alternatively, the nut 60 could be completely removed from the stud 50 to permit movement of the blade housing 56 (see FIG. 7).

It is within the ambit of the present invention where an alternative locking device is provided to restrict movement of the blade housing 56 out of the blade-securing condition. For instance, the blade carrier assembly 24 could include a threaded fastener that extends through the locking section 110 in a longitudinal direction along the handle axis and is threaded into the housing end 64 so that the locking section 110 and housing end 64 are secured to one another. Alternatively, the blade carrier assembly 24 could include a latch with an over-center mechanism to restrict movement out of the blade-securing condition.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A rotary knife comprising:
   a handle;
   a rotatable annular blade; and
   a blade carrier assembly including an expandable blade housing operably coupled to the handle and configured to removably support the blade,
   said blade housing being movable relative to the handle between a blade-securing condition, in which the blade housing securely supports the blade for rotational operation, and a relatively expanded blade-releasing condition, in which the blade housing permits removal and installation of the blade relative to the blade housing,
   said carrier assembly including a lever mechanism shiftably mounted relative to the handle and configured when shifted to expand the blade housing from the blade-securing condition to the blade-releasing condition,
   said lever mechanism engaging the blade housing to move the blade housing from the blade-securing condition to the blade-releasing condition,
   said blade housing being generally annular in shape and presenting adjacent housing ends that are moved away from one another when the blade housing expands from the blade-securing condition to the blade-releasing condition,
   said blade housing defining a follower surface,
   said lever mechanism presenting a cam surface that engages the follower surface when the lever mechanism is shifted in a first direction to thereby cause the housing ends to separate,
   said lever mechanism being pivotal between open and closed positions, with the lever mechanism moving in the first direction from the closed position to the open position,
   said blade housing being resiliently expanded when the housing ends are separated by the lever mechanism, such that the blade housing exerts a force against the lever mechanism,
   said lever mechanism having an over-center position spaced between the open and closed positions, with the force exerted by the blade housing urging the lever mechanism in the first direction when the lever mechanism is positioned between the over-center and open positions, and with the force exerted by the blade housing urging the lever mechanism in an opposite second direction when the lever mechanism is positioned between the over-center and closed positions.

2. The rotary knife as claimed in claim 1,
   said carrier assembly including a lock for selectively locking the lever mechanism in the closed position,
   said lever mechanism presenting a lock surface that is configured to engage the blade housing and thereby prevent the housing ends from separating when the lever mechanism is locked in the closed position.

3. The rotary knife as claimed in claim 2,
   said lever mechanism presenting a stop surface that is configured to engage the blade housing and thereby prevent the housing ends from returning toward one another when the lever mechanism is in the open position.

4. A rotary knife comprising:
   a handle;
   a rotatable annular blade; and
   a blade carrier assembly including an expandable blade housing operably coupled to the handle and configured to removably support the blade,
   said blade housing being movable relative to the handle between a blade-securing condition, in which the blade housing securely supports the blade for rotational operation, and a relatively expanded blade-releasing condition, in which the blade housing permits removal and installation of the blade relative to the blade housing,
   said carrier assembly including a lever mechanism shiftably mounted relative to the handle and configured when shifted to expand the blade housing from the blade-securing condition to the blade-releasing condition,
   said lever mechanism engaging the blade housing to move the blade housing from the blade-securing condition to the blade-releasing condition,
   said blade housing being generally annular in shape and presenting adjacent housing ends that are moved away from one another when the blade housing expands from the blade-securing condition to the blade-releasing condition,
   said blade housing defining a follower surface,
   said lever mechanism presenting a cam surface that engages the follower surface when the lever mechanism is shifted in a first direction to thereby cause the housing ends to separate,
   said lever mechanism presenting a lock surface that is configured to engage the blade housing and thereby prevent the housing ends from separating when the lever mechanism is locked against movement in the first direction.

5. The rotary knife as claimed in claim 4,
   said follower surface being defined adjacent one of the housing ends,
   said lock surface being configured to engage the one housing end.

6. The rotary knife as claimed in claim 4,
   said carrier assembly including a lock for selectively preventing the lever mechanism from shifting in the first direction.

7. The rotary knife as claimed in claim 6,
   said lock comprising a threaded clamp member configured to frictionally engage the lever mechanism.

8. A rotary knife comprising:
   a handle;
   a rotatable annular blade; and
   a blade carrier assembly including an expandable blade housing operably coupled to the handle and configured to removably support the blade,
   said blade housing being movable relative to the handle between a blade-securing condition, in which the blade housing securely supports the blade for rotational operation, and a relatively expanded blade-releasing condition, in which the blade housing permits removal and installation of the blade relative to the blade housing,
   said carrier assembly including a lever mechanism shiftably mounted relative to the handle and configured when shifted to expand the blade housing from the blade-securing condition to the blade-releasing condition,
   said lever mechanism being pivotal between an open position corresponding to the blade-releasing condition of the blade housing and a closed position corresponding to the blade-securing condition of the blade housing.

9. The rotary knife as claimed in claim 8,
said lever mechanism engaging the blade housing to move the blade housing from the blade-securing condition to the blade-releasing condition.

10. The rotary knife as claimed in claim 9,
said blade housing being generally annular in shape and presenting adjacent housing ends that are moved away from one another when the blade housing expands from the blade-securing condition to the blade-releasing condition,
said blade housing defining a follower surface,
said lever mechanism presenting a cam surface that engages the follower surface when the lever mechanism is shifted in a first direction to thereby cause the housing ends to separate.

11. The rotary knife as claimed in claim 10,
said follower surface being defined adjacent one of the housing ends.

12. The rotary knife as claimed in claim 8,
said carrier assembly including a lock for selectively locking the lever mechanism in the closed position,
said lever mechanism being configured to prevent the blade housing from expanding from the blade-securing condition to the blade-releasing condition when the lever mechanism is locked in the closed position.

13. The rotary knife as claimed in claim 12,
said lever mechanism and said blade housing engaging one another as the lever mechanism pivots between the open and closed positions,
said blade housing being resiliently expanded from the blade-securing condition to the blade-releasing condition, such that the blade housing exerts a force against the lever mechanism,
said lever mechanism having an over-center position spaced between the open and closed positions, with the force exerted by the blade housing urging the lever mechanism toward the open position when the lever mechanism is positioned between the over-center and open positions, and with the force exerted by the blade housing urging the lever mechanism toward the closed position when the lever mechanism is positioned between the over-center and closed positions.

14. The rotary knife as claimed in claim 13,
said lever mechanism being configured to prevent the blade housing from resiliently returning to the blade-securing condition when the lever mechanism is in the open position.

15. The rotary knife as claimed in claim 8,
said lever mechanism and said blade housing engaging one another as the lever mechanism causes the blade housing to expand from the blade-securing condition to the blade-releasing condition,
said blade housing being resiliently expanded from the blade-securing condition to the blade-releasing condition, such that the blade housing exerts a force against the lever mechanism.

16. The rotary knife as claimed in claim 8,
said blade housing being generally annular in shape and presenting adjacent housing ends that are moved away from one another when the blade housing expands from the blade-securing condition to the blade-releasing condition.

17. The rotary knife as claimed in claim 16,
said blade housing presenting a housing bearing surface,
said blade presenting a blade bearing surface in an opposed relationship with the housing bearing surface; and
an annular bushing received on the bearing surfaces,
said annular bushing rotatably supporting the blade on the blade housing.

18. The rotary knife as claimed in claim 17,
said bushing including an elongated bushing body,
said bushing body terminating at spaced-apart circumferential ends and presenting a circumferential length defined between the ends.

\* \* \* \* \*